United States Patent
Barnes et al.

(10) Patent No.: US 9,737,447 B2
(45) Date of Patent: Aug. 22, 2017

(54) METHOD AND SYSTEM FOR SECURE WHEELCHAIR USE IN DEMAND RESPONSE TRANSPORTATION SYSTEMS

(71) Applicant: Trapeze Software ULC, Mississauga (CA)

(72) Inventors: Sharon Ann Irma Barnes, Scottsdale, AZ (US); Marty Charles Brooks, Scottsdale, AZ (US); Paul Ernsdorff, Spokane, WA (US); Marsha Louise Moore, Scottsdale, AZ (US)

(73) Assignee: Trapeze Software ULC, Mississauga (CA)

( * ) Notice: Subject to any disclaimer, the term of this patent is extended or adjusted under 35 U.S.C. 154(b) by 0 days.

(21) Appl. No.: 15/153,474

(22) Filed: May 12, 2016

(65) Prior Publication Data

US 2016/0331606 A1    Nov. 17, 2016

Related U.S. Application Data

(60) Provisional application No. 62/160,029, filed on May 12, 2015.

(51) Int. Cl.
| | |
|---|---|
| *B60Q 1/00* | (2006.01) |
| *A61G 3/08* | (2006.01) |
| *H04W 4/04* | (2009.01) |
| *B60P 7/08* | (2006.01) |

(52) U.S. Cl.
CPC .......... *A61G 3/0808* (2013.01); *B60P 7/0861* (2013.01); *H04W 4/046* (2013.01)

(58) Field of Classification Search
CPC .............. A61G 3/0808; A61G 2203/32; A61G 2203/44; A61G 2220/12; A61G 2220/16; A61G 3/08; B60P 7/0861; H04W 4/046; B60R 22/48; G06F 11/30; G08B 21/02; G09B 5/06
USPC ................ 340/457.1, 457, 573.1, 574, 686.1
See application file for complete search history.

(56) References Cited

U.S. PATENT DOCUMENTS

| | | | | |
|---|---|---|---|---|
| 5,026,225 | A * | 6/1991 | McIntyre ................ | B60R 22/00 280/304.1 |
| 6,113,325 | A * | 9/2000 | Craft .................... | A61G 3/0808 296/65.04 |
| 7,040,847 | B1 * | 5/2006 | Cardona ............... | A61G 3/0808 410/12 |
| 2013/0088348 | A1 * | 4/2013 | Verachtert ............... | B60R 22/48 340/457.1 |

* cited by examiner

*Primary Examiner* — Anh V La
(74) *Attorney, Agent, or Firm* — Elan IP Inc.

(57) ABSTRACT

There is a system for secure use of a wheelchair in demand response transportation systems comprising a wheelchair restraint comprising a central housing disposed between a vehicle strap and a wheelchair strap, the vehicle strap to secure the wheelchair restraint to the demand response vehicle, further comprising a vehicle strap sensor configured to provide a vehicle strap sensor electrical signal indicating whether the vehicle strap is securely affixed to a wheelchair anchor of a demand response vehicle, the wheelchair strap to secure the wheelchair restraint to the wheelchair, further comprising a wheelchair strap sensor configured to provide a wheelchair strap sensor signal indicating whether the wheelchair strap is securely connected to a wheelchair via the wheelchair strap.

9 Claims, 7 Drawing Sheets

METHOD AND SYSTEM FOR SECURE WHEELCHAIR USE IN DEMAND RESPONSE TRANSPORTATION SYSTEMS

FIELD OF THE INVENTION

The present invention relates generally to secure wheelchair use in demand response (DR) transportation systems. More particularly, the present invention relates to a method and system for using various sensors and radio frequency identification tags to ensure proper installation of wheelchairs in demand response vehicles.

BACKGROUND OF THE INVENTION

Wheelchairs are secured in demand response vehicles (DRV) to allow transportation of clients in wheelchairs. Typically such wheelchairs are secured via one or more (typically four) wheelchair tiedowns, each tiedown having an end that is removably attached to the DRV and one that is attached to the wheelchair. If either end is removed unintentionally due to improper securement, such as in an accident scenario, the wheelchair is not secured and injury may occur. Proper securement relies on installation by DRV operators. Though skilled and knowledgeable about securement, such operators are under time pressures to maintain their demand response schedule—the order and timing of the pickups and drop-offs of clients. There can thus be some improper securements, resulting in possible injuries.

It is therefore an object of the invention to provide a novel method and system for secure wheelchair use in demand response transportation systems.

SUMMARY OF THE INVENTION

There is a wheelchair restraint for use in a demand response vehicle, for securing a wheelchair to the demand response vehicle, the wheelchair restraint comprising: a central housing disposed between a vehicle strap and a wheelchair strap; a vehicle strap to secure the wheelchair restraint to the demand response vehicle, further comprising a vehicle strap sensor configured to provide a vehicle strap sensor electrical signal indicating whether the vehicle strap is securely affixed to a wheelchair anchor of the demand response vehicle; a wheelchair strap to secure the wheelchair restraint to the wheelchair, further comprising a wheelchair strap sensor configured to provide a wheelchair strap sensor signal indicating whether the wheelchair strap is securely connected to a wheelchair via the wheelchair strap; a tag configured to: receive the vehicle strap sensor signal and the wheelchair strap sensor signal; and communicate the vehicle strap sensor signal and the wheelchair strap sensor signal via radio frequency identification to a processing tag.

The vehicle strap may further comprise an anchorage connector, that connects with the wheelchair anchor when in a lowered position, and a plunger, wherein when the anchorage connector is in the lowered position the plunger is pushed into the vehicle strap sensor such that the vehicle strap sensor indicates the vehicle strap is securely affixed.

The wheelchair restraint may further comprise a vehicle engaged line that is level when the anchorage connector is in the lowered position and not level when the anchorage connector is not in the lowered position.

The tag may be configured to receive the vehicle strap sensor signal via one or more inductive rings disposed on either side of one or more gaps between the tag and the vehicle strap sensor.

The wheelchair strap sensor may further comprise a first magnet disposed with the central housing proximate to where the wheelchair strap connects to the central housing, and a second magnet disposed on the wheelchair strap and remote from the central housing when the wheelchair strap is in a fully extended position.

The wheelchair restraint may further comprise a mobile data terminal, located on the demand response vehicle and comprising the processing tag, wherein the mobile data terminal is further configured to: instruct a driver of the demand response vehicle to perform a pickup of a client; determine if the client has a wheelchair; and allow the driver to indicate the driver has performed the pickup, wherein, if the client has a wheelchair the allowing further comprises looking for the wheelchair strap sensor signal to indicate the wheelchair strap is securely connected to a wheelchair via the wheelchair strap and the vehicle strap sensor electrical signal to indicate the vehicle strap is securely affixed to the wheelchair anchor of the demand response vehicle.

There is further a system for secure use of a wheelchair in demand response transportation systems comprising: a wheelchair restraint comprising a central housing disposed between a vehicle strap and a wheelchair strap, a vehicle strap to secure the wheelchair restraint to the demand response vehicle, further comprising a vehicle strap sensor configured to provide a vehicle strap sensor electrical signal indicating whether the vehicle strap is securely affixed to a wheelchair anchor of a demand response vehicle; a wheelchair strap to secure the wheelchair restraint to the wheelchair, further comprising a wheelchair strap sensor configured to provide a wheelchair strap sensor signal indicating whether the wheelchair strap is securely connected to a wheelchair via the wheelchair strap and a tag configured to: receive the vehicle strap sensor signal and the wheelchair strap sensor signal; and communicate the vehicle strap sensor signal and the wheelchair strap sensor signal via radio frequency identification to a processing tag; and a mobile data terminal further comprising a processing tag and a status indicator, the mobile data terminal configured to: receive the vehicle strap sensor signal and the wheelchair strap sensor signal from the tag; and determine whether the wheelchair is in a secure state; and indicate whether the wheelchair is in a secure state.

The mobile data terminal may be further configured to prevent operation of the demand response vehicle if the indication is the wheelchair is not in a secure state.

The indicating may further be to a central management system that confirms the wheelchair is properly loaded.

There is also a method for secure use of a wheelchair in demand response transportation systems comprising: placing a wheelchair in a demand response vehicle; affixing a vehicle strap of a wheelchair restraint to the demand response vehicle; connecting a wheelchair strap of the wheelchair restraint to the wheelchair; determining whether the affixing was successful; learning whether the connecting was successful; and indicating the results of the determining and learning.

The learning may be based on a wheelchair strap sensor signal indicating the wheelchair strap is securely connected to the wheelchair via the wheelchair strap and the determining may be based on a vehicle strap sensor electrical signal indicating the vehicle strap is securely affixed to a wheelchair anchor of the demand response vehicle.

The determining may be based on affixing rules and the connecting is based on connecting rules.

The method may further comprise disabling the demand response vehicle if either the determining or learning was not successful.

The method may further comprise instructing a driver of the demand response vehicle to perform a pickup of a client; determining if the client has a wheelchair; and allowing the driver to indicate the driver has performed the pickup.

The allowing may be based on the determining and the learning.

There is a wheelchair restraint for use in a demand response vehicle, for securing a wheelchair to the demand response vehicle, the wheelchair restraint comprising:
  a central housing disposed between a vehicle strap and a wheelchair strap;
  a vehicle strap to secure the wheelchair restraint to the demand response vehicle, further comprising a vehicle strap sensor configured to provide a vehicle strap sensor electrical signal indicating whether the vehicle strap is securely affixed to wheelchair anchor of a demand response vehicle;
  a wheelchair strap to secure the wheelchair restraint to the wheelchair, further comprising a wheelchair strap sensor configured to provide a wheelchair strap sensor signal indicating whether the wheelchair strap is securely connected to a wheelchair via the wheelchair strap;
  a tag configured to:
    receive the vehicle strap sensor signal and the wheelchair strap sensor signal; and
    communicate the vehicle strap sensor signal and the wheelchair strap sensor signal via radio frequency identification to a processing tag.

There is also a system for secure use of a wheelchair in demand response transportation systems comprising:
  a wheelchair restraint comprising a central housing disposed between a vehicle strap and a wheelchair strap, a vehicle strap to secure the wheelchair restraint to the demand response vehicle, further comprising a vehicle strap sensor configured to provide a vehicle strap sensor electrical signal indicating whether the vehicle strap is securely affixed to a wheelchair anchor of a demand response vehicle;
  a wheelchair strap to secure the wheelchair restraint to the wheelchair, further comprising a wheelchair strap sensor configured to provide a wheelchair strap sensor signal indicating whether the wheelchair strap is securely connected to a wheelchair via the wheelchair strap and a tag configured to:
    receive the vehicle strap sensor signal and the wheelchair strap sensor signal; and
    communicate the vehicle strap sensor signal and the wheelchair strap sensor signal via radio frequency identification to a processing tag;
  a processing tag configured to:
    receive the vehicle strap sensor signal and the wheelchair strap sensor signal from the tag; and
    communicate the vehicle strap sensor signal and the wheelchair strap sensor signal to a status indicator; and
  a status indicator configured to:
    receive the vehicle strap sensor signal and the wheelchair strap sensor signal;
    determine whether the wheelchair is in a secure state; and indicate whether the wheelchair is in a secure state.

There is further a method for secure use of a wheelchair in demand response transportation systems comprising:
  placing a wheelchair in a demand response vehicle;
  affixing a wheelchair restraint to the demand response vehicle;
  connecting the wheelchair restraint to the wheelchair;
  determining whether the affixing was successful;
  learning whether the connecting was successful; and
  indicating the results of the determining and learning.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
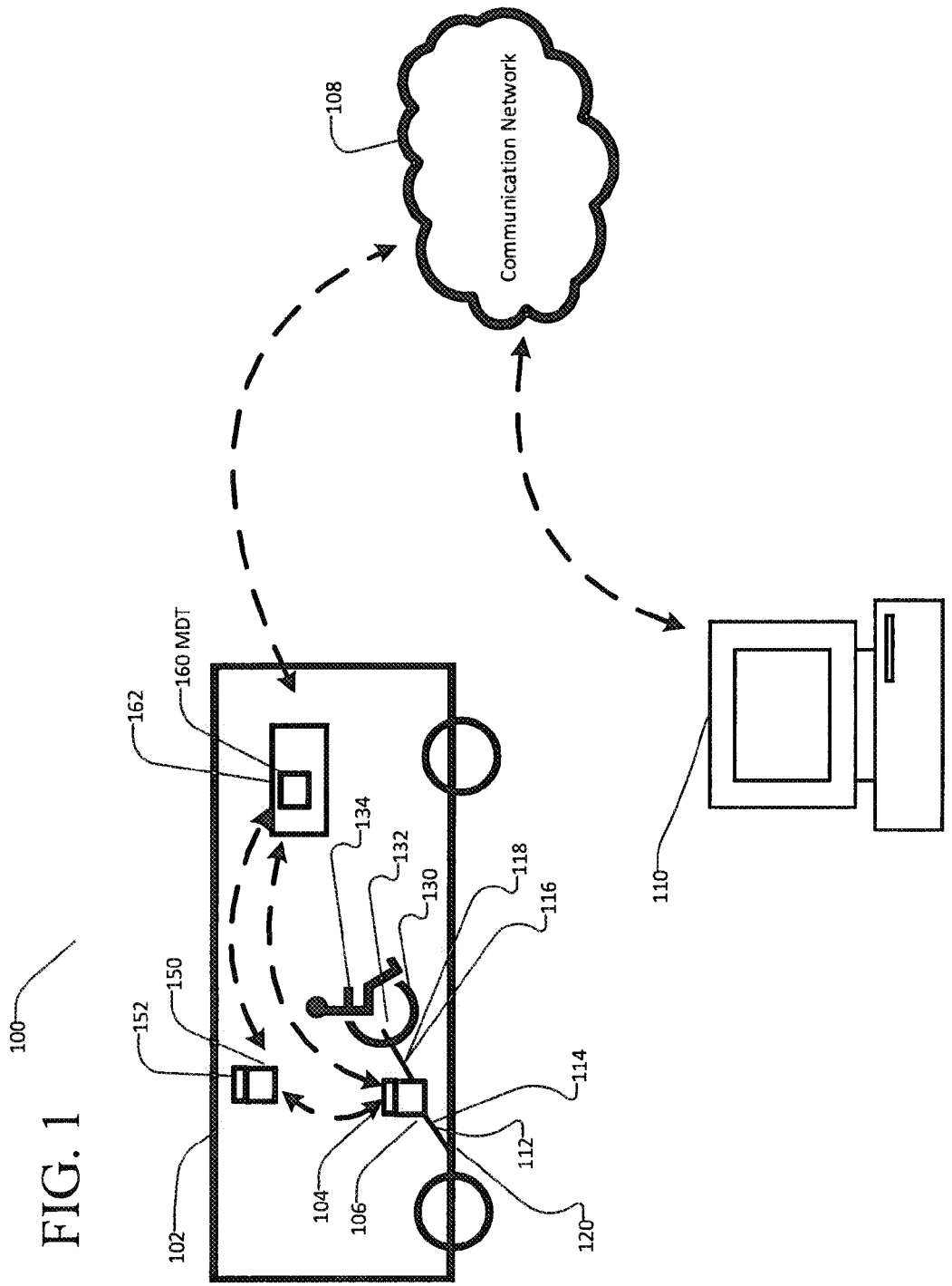
FIG. 1 shows a high-level architecture of a system for secure wheelchair use in demand response transportation systems in accordance with an embodiment of the invention.

FIG. 1 is a high-level architecture of system 100 for secure wheelchair use in demand response transportation systems comprising demand response vehicle (DRV) 102, further comprising mobile data terminal (MDT) 106, vehicle slot (wheelchair anchorage) 120, tiedown assembly (or wheelchair restraint) 106 further comprising tag 104, vehicle strap 112 further comprising vehicle strap sensor 114, and wheelchair strap 116 further comprising wheelchair strap sensor 118, communication network 108 and central management system 110, wheelchair 130 further comprising wheelchair connection point 132, client 134 and vehicle indicator (or wheelchair status indicator) 150 further comprising vehicle tag (or wheelchair status tag) 152.

System

System 100 allows client 134 in wheelchair 132 to be securely seated in, and attached to, DRV 102. System 100 may further allow such secure attachment to confirmed (via one or more sensors, such as vehicle strap sensor 114 and wheelchair strap sensor 118), monitored by a driver of DRV (such as via MDT 106 and/or wheelchair status indicator 150), and ensure safe operation of DRV (as described herein, such as by locking MDT 106 and/or mechanical systems of DRV 102 such as throttle or ignition). System 100 may be used by fleet operators, transit agencies, and other paratransit or demand-response operators.

Wheelchair Restraint and Components

Wheelchair restraint 106 may be substantially as known to those of skill in the art, subject to the additions described herein. An exemplary tiedown assembly 106 may be wheelchair restraints from Q-Straint™, such as Q-Straint™ adjustable wheelchair straps or the like. Such wheelchair restraint 106 may be modified by adding tag 104, vehicle strap sensor 114 and wheelchair strap sensor 118, as described herein.

Tag 104 may further comprise sensors, or be operably connected to sensors, as described herein, that allow it to gather information regarding the status of wheelchair restraints 106.

Tag 104 may provide protection from weather elements and handle a wide range of temperatures. Tag 104 may be powered by an onboard power source, such as battery 208, as described herein.

Figure 4:
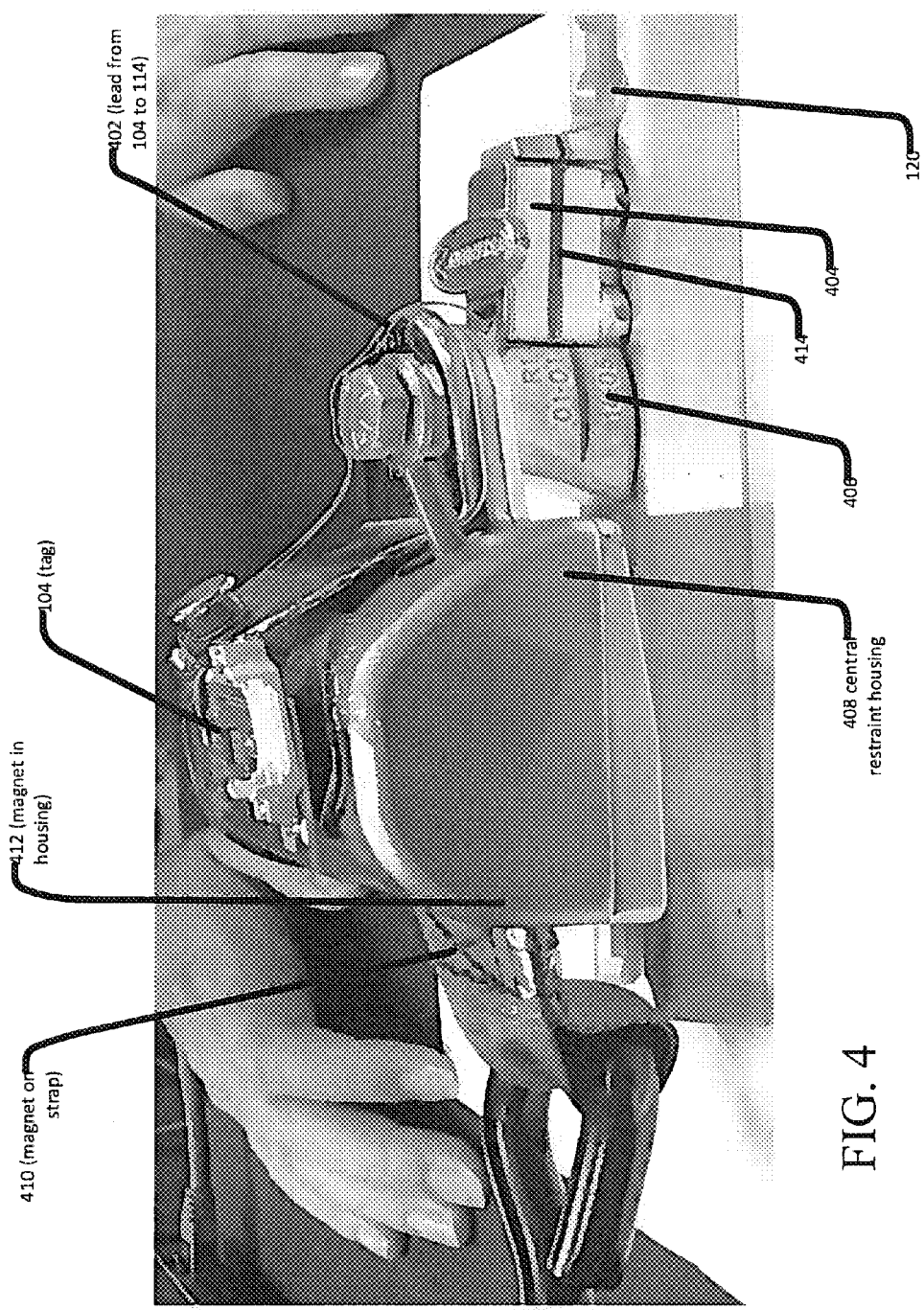
FIG. 4 is a wheelchair restraint in accordance with an embodiment of the invention.

Tag 104, as shown in FIG. 4, is located on wheelchair restraint 106 but may be located in central housing.

Vehicle strap sensor 114 may be any sensor that can sense if wheelchair restraint 106 is correctly fastened to DRV anchorage 120 and can communicate such to tag 104.

In one embodiment, such as shown in FIGS. 4/5a/5b, vehicle strap sensor 114 comprises button 502 that when pressed by plunger 504 indicates to tag 104 (via lead 402) that vehicle strap 112 is properly seated in wheelchair anchorage 120. This may occur as anchorage connector 404 is in the lowered position, meaning that plunger 504 is pushed up and into button 502, and thus anchorage connector has connected properly with wheelchair anchorage 120 and is in a "secured" state. Such an embodiment may be accomplished by inserting, in a restraint housing cavern 508 (a section formed by the inner walls of central restraint housing 406) and/or anchorage connector cavern 510 (a section formed by the inner walls of anchorage connector housing 404), plunger 504 that is shaped to allow it to extend down through plunger exit 506 to contact with wheelchair anchorage 120 and thus be pushed up into button 502.

Figure 5A:
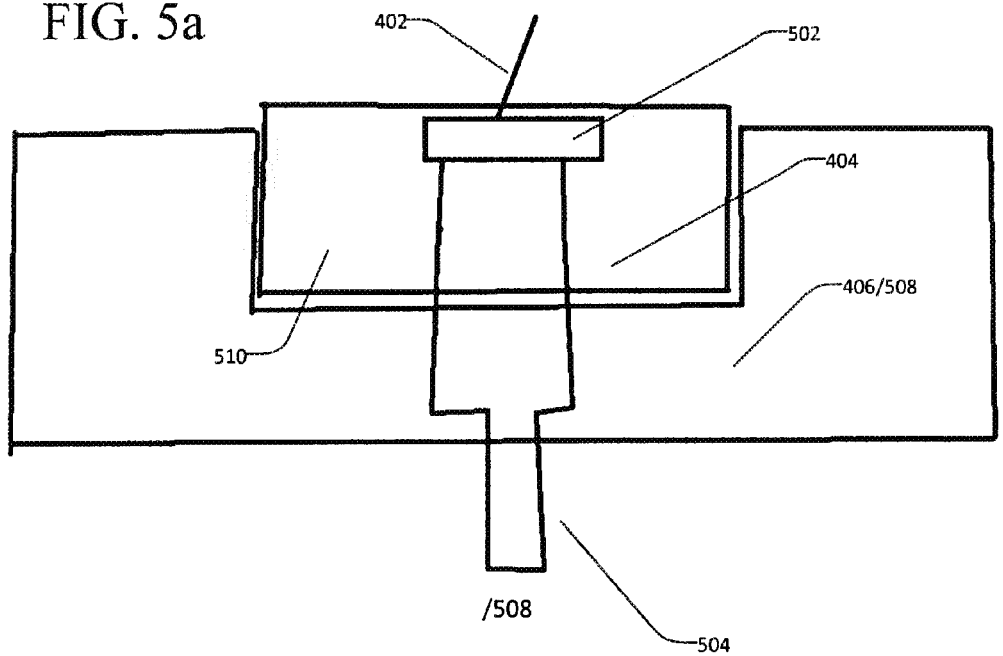
FIGS. 5a and 5b are simplified cross-section views of a wheelchair restraint in accordance with an embodiment of the invention.
Figure 5B:
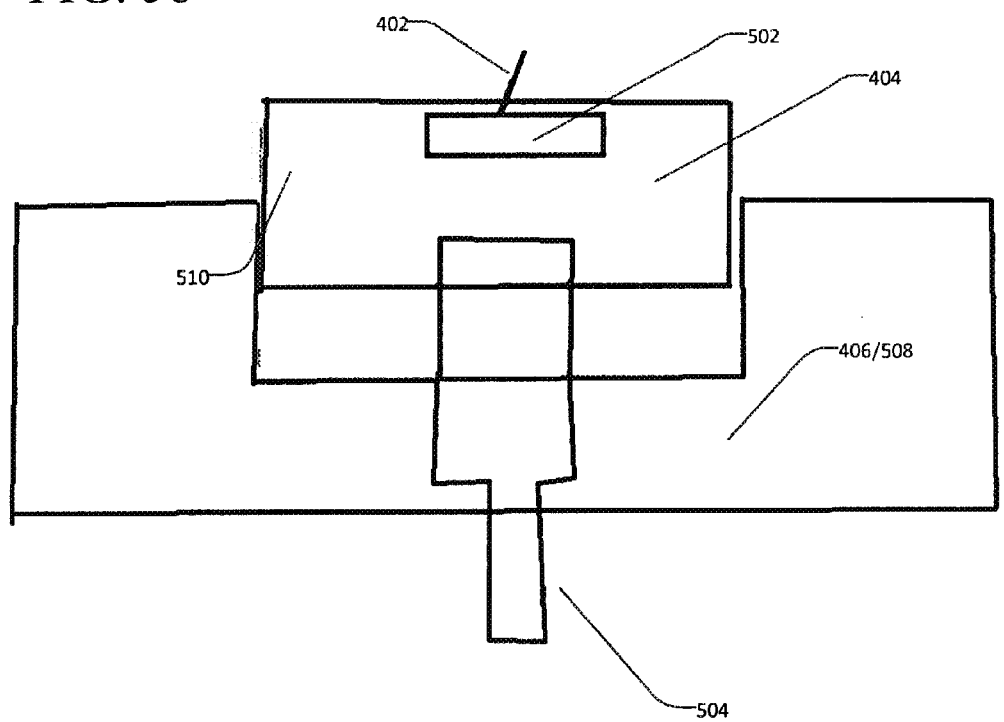

It should be noted that the cross section shown in FIG. 5 is intended to approximate a cross section of those elements in FIG. 4, sufficiently accurate to show the concept of button 502.

In another embodiment there is a spring loaded lever (not shown) that is retracted as the mechanism (the combination of 404/406) is seated into the track (wheelchair anchorage 120). When properly seated, this lever is forced down by the spring and "locks" the mechanism in the track. Inside the lever, there is button 502 with plunger 504. When the lever is retracted, plunger 504 retracts inside the mechanism so that it cannot be pushed down. When the lever springs back (as it descends into the track), plunger 504 comes down and hits the bottom of the track causing the plunger to go up and the button to be pushed down. This signal, from button 502, goes to the RFID tag through a digital input.

Leads 402 are shown outside of wheelchair restraint 106 but may be largely disposed within components of wheelchair restraint to arrive from button 502 to tag 104, such as via 508/510 and central housing 408. Gaps, between 508-510 and 510-408 may be "bridge" via inductive rings disposed on either side of the gap, preferably inside 508, 510 and 510, 408.

Wheelchair strap sensor 118 may be any sensor that can sense if wheelchair restraint 106 is correctly fastened to wheelchair 130 and can communicate such to tag 104.

In one embodiment, such as shown in FIGS. 4 wheelchair strap sensor may comprise one magnet placed on wheelchair strap 116 (preferably near the end of wheelchair strap 116 that is remote from central housing when fully extended) and one magnet disposed within central housing 406 and reasonably proximate to where wheelchair strap 116 exits central housing 406 such that when wheelchair strap 116 is not extended the magnets register a magnetic signal that is sent to tag 104, and an opposite signal is sent to tag 104 when the magnets are not close enough to produce a magnetic signal (thus indicating that wheelchair strap is extended and has been attached to wheelchair 130 by the driver).

Thus, via wheelchair strap sensor 118 and vehicle strap sensor 114 tag 104 knows whether wheelchair restraint 106 is secured to wheelchair 130 and wheelchair anchorage, respectively. They may be provided as digital inputs, "vehicle connection status" and "wheelchair connection status", to tag 104.

Tag 104 may be an RFID tag, as described herein. It may receive data, via leads from wheelchair strap sensor 118 and vehicle strap sensor 114, the "vehicle connection status" or "vehicle strap sensor signal" and "wheelchair connection status" or "wheelchair strap sensor signal" signals, which may be electrical signals. Tag 104 may then provide such signals to MDT 160 and/or MSI 150, via RFID communications.

Wheelchair

Wheelchair 130 may be substantially any wheelchair as is known in the art that may have one or more wheelchair connection points 132, to which straps may be attached to secure wheelchair 130 in place, and in which client 134 may sit.

Wheelchair Status Indicator

Wheelchair status indicator (WSI) 150 may be a device, located in DRV 102 that indicates the status of one or more wheelchairs 130 in DRV 102. WSI may comprise one or more visual or auditory indicators, or the like, to allow a driver to know the status of any one or more wheelchairs in DRV 102. WSI may be a bank of LEDs, each LED representing the status of a wheelchair in a particular position in DRV. An LED may not be illuminated if there is no wheelchair 130 in the position, lit if the wheelchair is in a secure state in the position, and blinking if the wheelchair is in an unsecure state in the position, for example.

WSI 150 may receive data (via RFID to wheelchair status tag 152 that may comprise vehicle strap sensor status and wheelchair strap sensor status) directly from wheelchair tiedown or restraint 106 that is then processed to determine the status of wheelchair 130 (as MDT 160 may not be required in all embodiments of the present invention). Alternatively WSI 150 may receive data (via RFID to wheelchair status tag 152 that may comprise vehicle strap sensor status and wheelchair strap sensor status or may simply indicate how to indicate wheelchair statuses) from MDT 160 (where MDT 160 may have done some or all of the required processing) or other components of system 100 that may be RFID-enabled.

Of course WSI may be any type of indicator and may be located substantially anywhere in DRV 102. WSI 150 may be a computer monitor, simple display, mobile computing device, and the like. WSI may not be required, for example if MDT 160 is present in DRV 102.

MDT and MDT-Application

MDT 160 is a computing device that may user input (such as keystrokes, clicks, touch inputs, and the like) and provides the user interface to functionality relating to the provision of transit services and secure wheelchair use in DRVs 102. MDT 160 may often be located on DRV 102, but may be removable therefrom. Exemplary MDTs 160 include mobile phones, tablets, Ranger™ devices from Trapeze™, laptops (that may be running Windows™ or iOS™ operating systems, for example), ruggedized laptops, vendor specific MDTs (such as Android™. Blackberry™ or Apple™ products). MDT 160 may further comprise an MDT tag 162 that may offer similar functionality to wheelchair status tag 152 (either or both of which may be referred to as "processing tags", for example if they process electrical signals from one or more sensors described herein), which may allow MDT to communicate with tag 104. Operators of DRV 102, or supervisors, may be some of the primary users of MDTs 22. MDT 22 may communicate with other elements of system 100, for example via communication network 108.

MDT 160 may be operated by a driver of DRV 102. MDT 160 (such as via MDT-A 160*a*) may provide and/or allow a driver to provide the following functionality (noting that some of this functionality may be provided by wheelchair indicator 150, or may be provided in conjunction with other elements of system 100):

a) Receive signals, such as via RFID to MDT tag 162, relating to one or more wheelchair restraints 106 for one or more wheelchairs b) Receive an indication from one or more tags 104 that a wheelchair 130 is not secured;

c) Affirm that all wheelchairs are secured;

d) Override an indication from one or more tags 104 that a wheelchair 130 is not secured.

MDT application, MDT-A, (not shown) is a software application residing on MDT 160. MDT-A 2160*a* largely controls MDT 160, including its operation and communication with other aspects of system 100. MDT-A 160*a* may be configured to present one or more screens (which may include output and input user interface elements) to a user of MDT 160, or otherwise accept or provide input or output (such as via sounds, vibrations, and the like) to enable to functionality described herein.

MDT 160 may communicate with tags 104 (such as via MDT tag 162)—such as by polling tags 104 to "listen" for communications thereto or therefrom, and the like, and as known to those of skill in the art. Communication may be wired or wireless such as by RFID. Communication may allow tags 104 to be controlled, monitored, and the like, such as by reading values associated with tag inputs (which may be from one or more sensors, such as vehicle strap sensor status and wheelchair strap sensor status), receiving statistics or system information therefrom, or setting values or otherwise controlling tags 104.

DRV

DRV 102 may be any demand response vehicle, or vehicle that is used to transport clients 134 in wheelchairs 130. DRV 102 may comprise other components and systems (not shown) including, but not limited to, electrical, mechanical and computer systems such as cooling systems, door opening systems, traditional vehicular systems (such as engines, odometers, temperature gauges, and the like).

Communication Network

Communication network 108 enables communication of information between various components of system 100 including, but not limited to, MDT 106 and central management system 110. Communication network 108 allows for a plurality of signals to be sent through its network simultaneously. Communication network 108 may be any public or private network, wired or wireless, and may be substantially comprised of one or more networks that may be able to communicate with each other. Communication network 108 may use a variety of mediums, such as cellular and WiFi networks. Communication networks 108 may not be required, for example, if components of system 100, such as MDT 106 and central management system 110 are able to communicate directly.

Central Management System

Central management system 110 may be a component of system 100 that provides functionality for users to operate systems or services that may be used by clients 134. This may include creating schedules (manifests) for DRVs 102, tracking the location of DRVs 102, diagnosing any issues with DRV 102 that may require servicing and scheduling any service work that may be required for DRV 102. Central management system 110 may be implemented via one or more pieces of software and may be operated by one or more users. Though it is shown in the figure as one computer, it can be composed of one or more computing and data storage devices and its functionality can be split up across these devices as appropriate. Of course central management system 110 may provide non-transit related functionality, depending on what DRVs 102 are involved. Central management system 110 may run the PASS™ application from Trapeze™, which provides robust demand response functionality.

In one embodiment PASS™ instructs a driver to go to a pickup location—an "Arrive". The "Arrive" is identified by the driver (such as via entering data in MDT 160) or by GPS (a GPS unit in MDT indicating DRV's 102 location to central management system 110 where the GPS location matches the GPS location of the "Arrive") as an event in PASS (or some other dispatch system). The driver then loads client 134 in DRV 102. If the client 134 has a wheelchair 130, four wheelchair restraints 106 may need to be secured in order for the system (ie logic in MDT 160, WSI 150 and/or central management system that may receive the data required from MDT 160 for example) to confirm the passenger is properly loaded. This may be a process that looks for four new wheelchair restraints to be secured or eight if there are two new passengers or some other permutation. Once this occurs, the system (either on MDT 160 or central management system 110 for example) will confirm the passenger is properly loaded (which might allow WSI to indicate a proper load). Driver then "Performs"—such as via entering such via screens of MDT 160—the driver indicating that clients 134 are loaded and the driver is starting/continuing the run (performing the various pick ups and drop offs that are part of the run in the manifest provided to them, for example via MDT 160). The system may do many things at this point:

1) Send message to dispatch on the state of the straps to confirm that they are secured properly 2) Only send a message if it is failing the confirmation 3) Create alerts in the MDT or vehicle itself about a failure to properly secure the straps 4) Create a condition that prevents the driver from engaging the vehicle (preventing them from getting the vehicle out of park).

The system 100, via central management system 110 and/or WSI 150, may also be create alerts on the MDT, messages to dispatch, or other actions if one or more straps fails during a route (such as if a client 134 undo their straps without drivers noticing).

It is to be understood that substantially any of the functionality and processing described herein may be performed on WSI 150, central management system 110, or MDT 160 depending on, for example, the components in a particular implementation and the constraints of such implementation.

Figure 2:
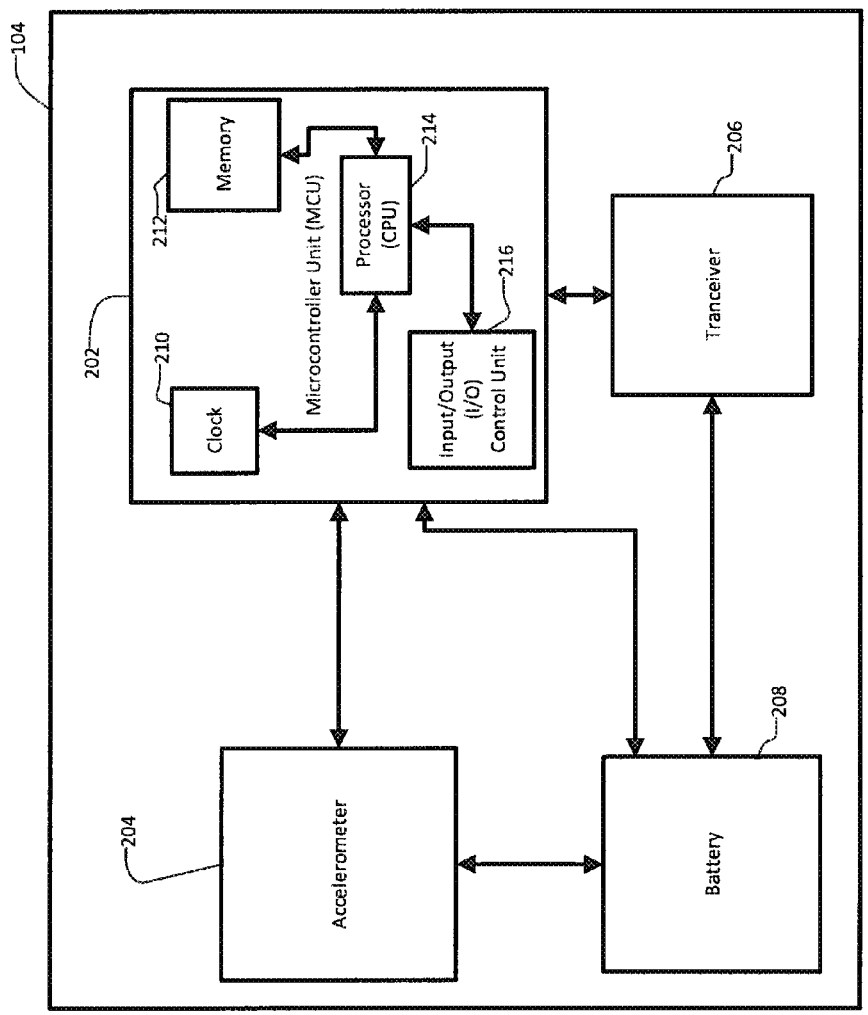
FIG. 2 shows a schematic of a tag according to an embodiment of the invention.

FIG. 2 shows a schematic of tag 104 (which may be similar to MDT tag 162 and wheelchair status tag 152) according to an embodiment of the invention. Tag 104 may be comprised of microcontroller unit (MCU) 202, accelerometer 204 and transceiver 206, any or all of which may be operably connected, for example to allow any required communication there between. Tag 104 further comprises battery 208, which may be operably connected to the other components in tag 104 to act as a power source for these other components.

MCU 202 may control operation of tag 104, determining when tag 104 should perform specific operations, such as communication, and directing the operations of accelerometer 204 and transceiver 206. MCU 202 may toggle or transition between one or more states of operation depending on factors such as its environment, clock cycles, whether tag 104 is in motion, and the like. Such states may include: a 'sleep' state, where only enough power is being used to ensure that tag 104 can move to another state when necessary; a 'motion detection' state, where tag 104 determines if it is in motion as described herein (which may be considered an intermediary between states); and one or more full power on states, where power is provided to substantially all portions of tag 104 required to transmit data or perform other required operations (and hence transition into a "full power" state). MCU 202 may have a configurable cycle (that may be timed by clock 210) where it 'powers on' (into 'motion detection') briefly to determine whether it, and/or other components of tag 104, require power to perform operations (and hence transition into 'full power'). For example, MCU 202, at the end of a clock cycle, may leave 'sleep' and enter 'motion detection' to query accelerometer 204 to determine whether tag 104 is in motion. If it is in motion, then tag 104 may move to 'full power' and other parts of tag 104 may be powered on to allow them to perform operations as required. Alternatively if MCU 202 is not in motion then no other parts of tag 104 may be powered on, and MCU may itself return to a 'sleep' state—and tag 104 has therefore conserved significant battery life.

MCU 202 may communicate directly with one or both of accelerometer 204 and transceiver 206, sending these components operation instructions and responding to the information it receives from them. For example, on awakening from a 'sleep' state, MCU 202 may provide or direct power to accelerometer 204 and then query accelerometer 204 to determine if DRV 102 is in motion (and turning power off, as appropriate based on the results of determining whether DRV 102 is in motion) and optionally provide or direct power to one or more other components of tag 104, such as transceiver 206 to enable transceiver 206 to perform required operations. Transceiver 206 may only be powered on if MCU 202 powers it on directly or sends it a signal that allows it to power on. MCU 202 may also communicate with systems outside of tag 104, for example other computer systems on DRV 102 (such as via I/O control unit 216), and use that information to determine what operations tag 104 should perform.

MCU 202 further comprises clock 208, memory 210, central processing unit (CPU) 212 and input/output ("I/O") control unit 216, and may comprise or house accelerometer 204 and/or transceiver 206 depending on hardware implementation details.

Accelerometer 204 can detect and measure changes in motion, for example an acceleration measurement (such as in m/s/s) and communicate with MCU 202 (such as by providing a reading). It can be awakened by MCU 202, which may send it a signal to tell accelerometer 204 to power on using battery 208, or power it on directly, and perform a motion detection reading, the results of which it can then pass along to MCU 202. Accelerometer 204 may require very little power to operate, and may return to sleep after the operation is complete, powering itself down until MCU 202 awakes it again. Accelerations measurements may be stored in memory 212, for example to use in 'motion detection' as described herein. For example, the two most recent readings may be stored, along with time stamps so that comparing acceleration readings can include how far apart the readings were taken (for example to help verify that differences actually indicate motion and a further reading is not required). It should be noted that various approaches to calculating and determining whether DRV 102 is in motion, based on accelerometer 204, are contemplated herein. For example, it may be desirable to ensure that acceleration is not simply constant or zero, but that DRV 102 is also not moving (ie has no velocity). In practice acceleration generally varies at least somewhat between readings despite near-constant velocity for DRV 102 hence a simple approach of comparing two acceleration readings is often, though not always, employed.

Transceiver 206 allows tag 104 to communicate with system 100. Transceiver may communicate substantially any of the information tag 104 has, collects or calculates, including, for example the location of tag 104. A more common approach to location determination may be via GPS technology, and tag 104 may have such technology. However GPS has downfalls for the present applications that may make it less desirable. For example, GPS is typically more power intensive, less accurate then some circumstances required herein (such as when in a bay), and relies on being in reception with GPS satellites, which is sometimes not possible. GPS receivers also do not send their location, they only receive it, thus making further technology required to communicate as required herein. It may thus be desirable to have two or more approaches to determining location, and use the more appropriate one for the circumstances. Transceiver 206 may generate and receive signals, between other components of system 100, wirelessly. Transceiver 206 may be able to convert signals that it receives wirelessly into a medium used to transmit information to MCU 202. Transceiver 206 may also receive information from MCU 202 that may control what signals or information transceiver 206 sends, when it will send signals, and when it will listen for signals to receive. Transceiver 206 may be a low power transceiver, such as the CC1101 produced by Texas Instruments, and may be able to enter a sleep state to minimize power usage when not in operation. Transceiver 206 may be further connected to an external antenna (not shown) to enhance its wireless communication range.

Battery 208 may store power for use by some or all of the components located on tag 104. It may power these components directly and/or independently, or may be routed through MCU 202 to the other components, with MCU 202 directing when accelerometer 204 and transceiver 206 receive power. It may be a light, small battery whose usage would have to be minimized to last for long periods of times. It may be charged by an external source. Exemplary batteries 208 may include rechargeable lithium batteries (such as lithium/ion or lithium/metal), nickel, metal hydride, supercapacitors, and the like.

Clock 210 may track time and provide a stable clock signal which may be used by CPU 214, and/or other components of tag 104, to perform operations. The clock also may be directly connected to other components within tag 104. This clock may be based on a crystal oscillator, or use another technology as would be known to those of skill in the art. Clock 210 may have one or more configurable timers or clock cycle timeouts, one of which may be a trigger for tag 104 to wake up when it expires. Other timers may exist during operation as well, causing tag 104 (and/or components thereof) to perform certain activities on expiry. Such other timers may have different times or frequencies depending on, for example, whether DRV 102 is in motion or not, or which state MCU 202 or tag 104 is in.

Memory 212 may allow information to be stored in tag 104. It may store or collect information from within MCU 202, or be sent information from other sources and store that information for later use by tag 104. This information can comprise programmed instructions as well as information collected by other components, and that may be used by other components, such as CPU 214. Memory 212 may comprise volatile memory such as random access memory, non-volatile memory such as varieties of read only memory, or a combination of both.

CPU 214 may control at least some of the operations of tag 104 by performing logical calculations using information it receives from the other components and instructions that may be stored in memory 212. CPU 214 may also use this information to determine what state tag 104 should be in, and may cause such state to be stored in memory 212, possibly along with other pieces of information, such as the last acceleration reading from accelerometer 204. It may determine what information should be stored in memory 212, and if information should be sent to components outside of MCU 202 using I/O control unit 216 and/or transceiver 206. CPU 214 may also determine what operations other components, inside and outside of MCU 202, should be performing, and if they should be in, or transition to, another state, such as 'sleep' state to lower power consumption.

I/O control unit 216 may send information to components outside of MCU 202, and receive information from outside components to be processed by MCU 202, which may include accelerometer 204 and transceiver 206. These outside components may be internal or external to tag 104. If the outside components are external to tag 104, the information may be sent wirelessly to the outside components from I/O control unit 216 via transceiver 206. I/O control unit 216 is in direct communication with CPU 214, which informs it as to what information to send, and receives information that I/O control unit 216 collects. CPU 214 can use this information as an input into its logical calculations.

Figure 3:
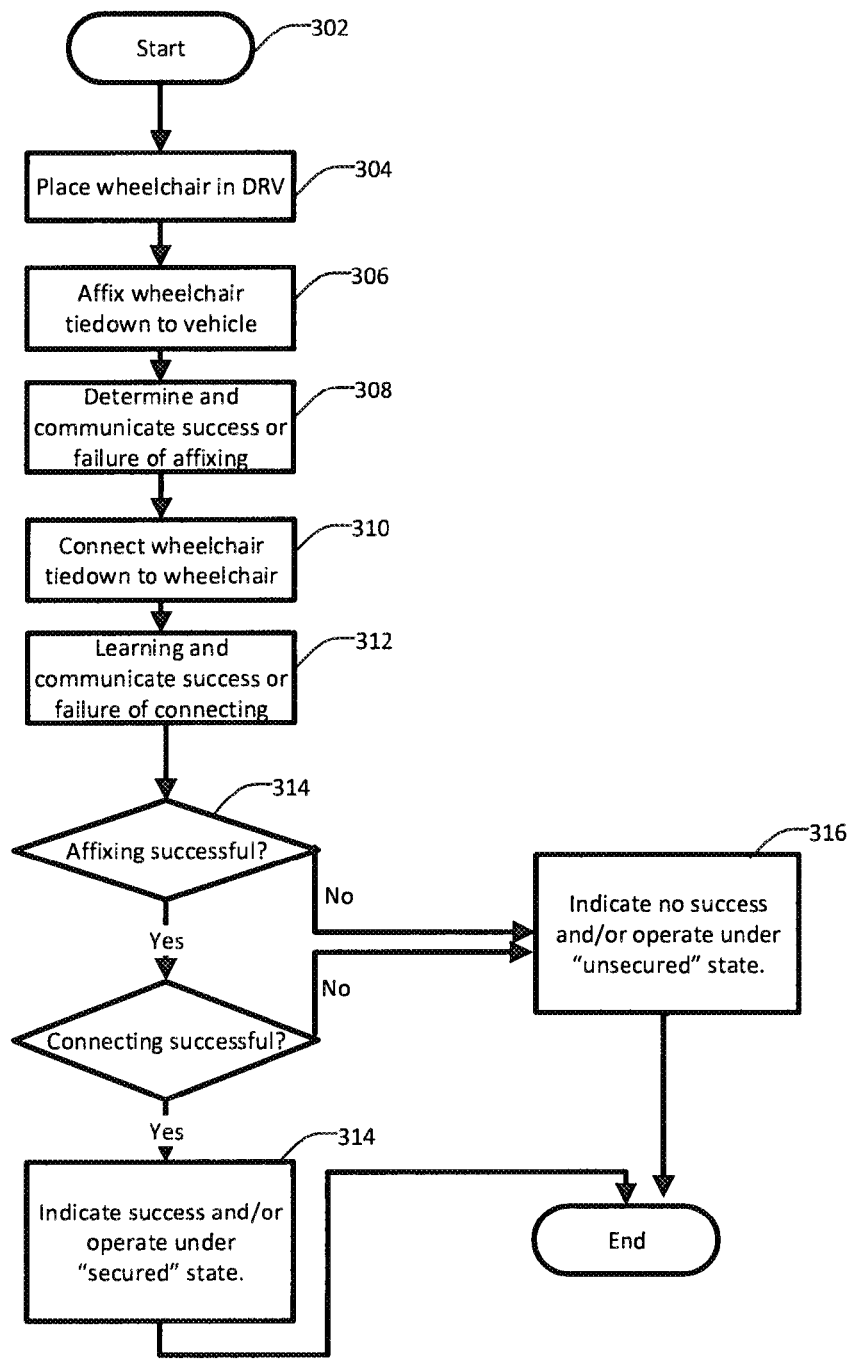
FIG. 3 is a flow chart of a method for secure wheelchair use in demand response transportation systems in accordance with an embodiment of the invention.

FIG. 3 is a flow chart of method 300 for secure wheelchair use in demand response transportation systems according to an embodiment of the invention.

Method 300 allows a driver of DRV 102, or other person (even client 134 themselves) to properly and securely seat client 134 in their wheelchair 130 in DRV 102. Alternatively, method 300 allows the driver to know, and possibly rectify, an unsecure seating or installation of wheelchair 130 in DRV 102.

Method 300 begins at 302 where the method starts. At 304 wheelchair 130 (or several wheelchairs 130) is placed in DRV 102, as is known in the art. This may be done in conjunction with, or following a manifest item (a pickup) that a driver might have to follow and that may be on MDT 160.

At 306 wheelchair tiedown 106 is affixed to wheelchair anchor 120, as is known in the art.

At 308 the success or failure of the affixing is determined and communicated. This may be done via processing various data from various sensors, as described herein. Various rules may be set for "success" for affixing ("Affixing Rules), such as:

a) All wheelchair restraints for all wheelchairs 130 must have proper sensor data sent from tag 104 (ie vehicle sensor signal indicates "secured", for example as plunger 504 has hit button 502);

b) For each wheelchair 130, even numbers of wheelchair restraints must have proper sensor data sent from tag 104.

At 310 wheelchair tiedown 106 is connected to wheelchair 130, as is known in the art.

At 312 the success or failure of the affixing is determined and communicated. This may be done via processing various data from various sensors, as described herein. Various rules may be set for "success" for connecting ("Connecting Rules") that may be similar to the Affixing Rules, or may be different in a particular implementation.

At 314 and 316 if affixing or connecting is not successful (for example if one or more Affixing Rules and/or Connecting Rules are determined to be violated) then method 300 continues to 318. At 318 an indication of no success may be provided (such as described herein, such as via MDT 160 and/or WSI 150). Additionally DRV 102 may be operated in an "unsecured" state or may be prevented from operating (such as disabling the ignition or motor). Further, the driver may be given the chance to cure the error (which may result in method 300 returning to 314.

If, at 314 and then 316 the affixing and connecting are successful then method 300 continues to 320 to indicate success and/or allow operation of DRV 102 in a "secured" state (as described herein, for example with how WSI 150 and/or MDT 160 operate).

Figure 6A:
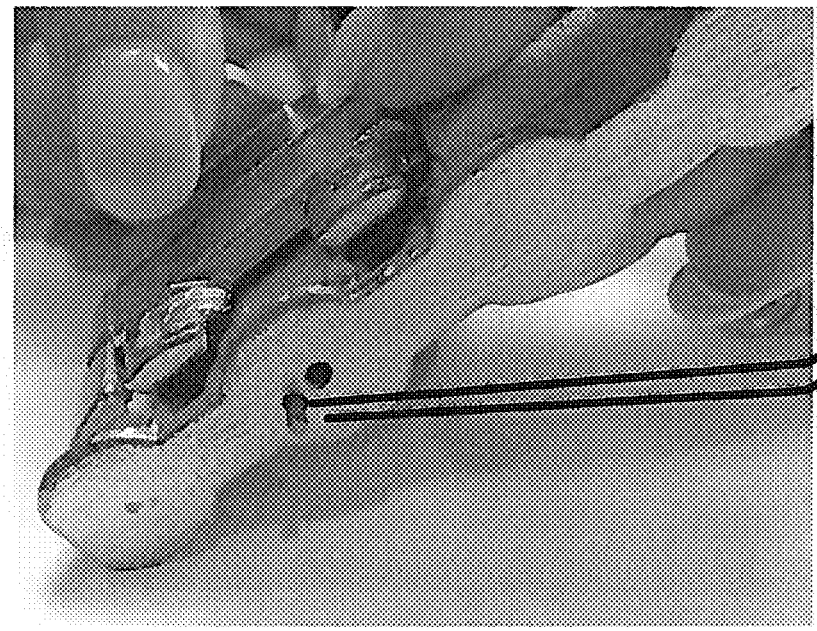
FIGS. 6a and 6b are views of a wheelchair restraint in accordance with an embodiment of the invention.
Figure 6B:
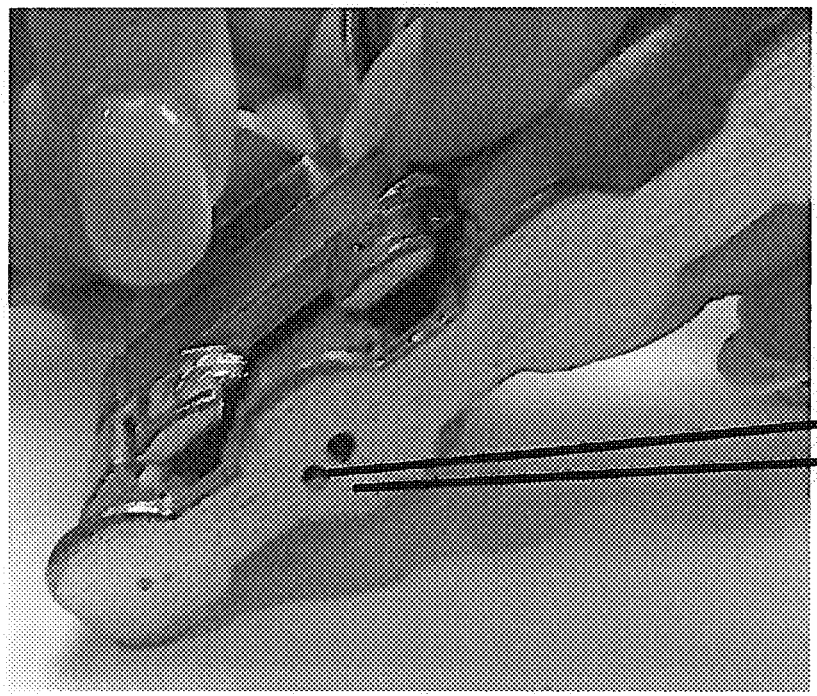
Figure 7A:
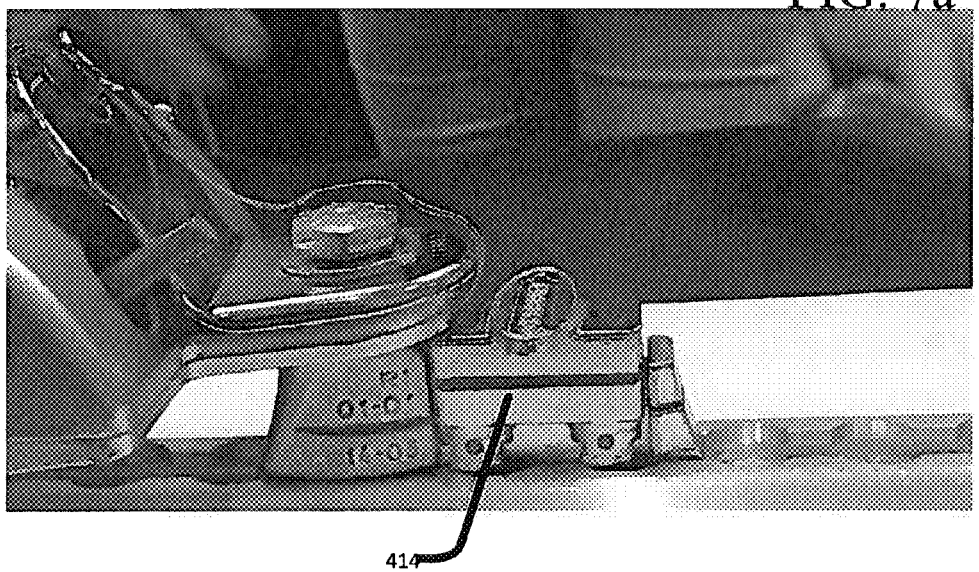
FIGS. 7a and 7b are views of a wheelchair restraint in accordance with an embodiment of the invention.
Figure 7B:
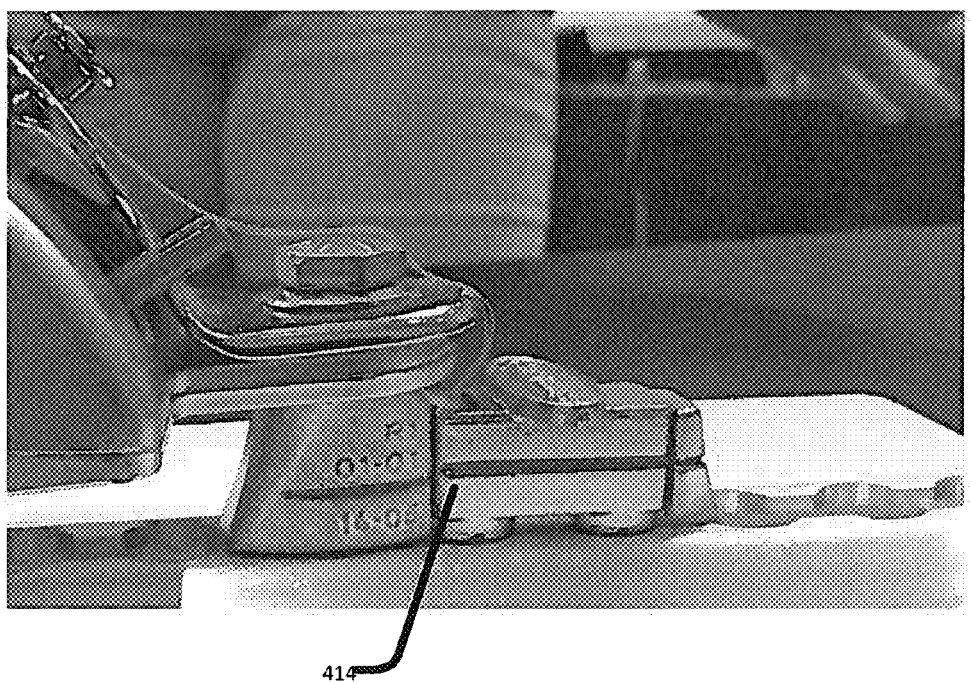

FIGS. 6*a* and 6*b* are views of a wheelchair restraint 106 in accordance with an embodiment of the invention and FIGS. 7*a* and 7*b* are views of a wheelchair restraint 106 in accordance with an embodiment of the invention. In FIG. 6, FIG. 6*a* shows a plunger 504*a* that is largely descended through plunger exit 506*a* and thus would not touch button 502 while FIG. 6*b* shows plunger 504*b* that is largely retracted into plunger exit 506*b* and thus would touch button 502 (assuming it was pushed by wheelchair anchor 120). In FIG. 7, FIG. 7*a* shows a wheelchair restraint that has not properly connected or affixed to wheelchair anchor 120, and thus vehicle engaged line 414 is not level. FIG. 7*b* shows a wheelchair restraint that has been properly connected or affixed to wheelchair anchor 120, and thus vehicle engaged line 414 is level.

The above-described embodiment is to be an example of the present invention and alterations and modifications may be effected thereto, by those of skill in the art, without departing from the scope of the invention that is defined solely by the claims appended hereto.

What is claimed is:

1. A wheelchair restraint for use in a demand response vehicle, for securing a wheelchair to the demand response vehicle, the wheelchair restraint comprising:

a central housing disposed between a vehicle strap and a wheelchair strap;

the vehicle strap to secure the wheelchair restraint to the demand response vehicle, further comprising a vehicle strap sensor configured to provide a vehicle strap sensor electrical signal indicating whether the vehicle strap is securely affixed to a wheelchair anchor of the demand response vehicle;

the wheelchair strap to secure the wheelchair restraint to the wheelchair, further comprising a wheelchair strap sensor configured to provide a wheelchair strap sensor signal indicating whether the wheelchair strap is securely connected to the wheelchair via the wheelchair strap;

a tag configured to:
receive the vehicle strap sensor signal and the wheelchair strap sensor signal; and communicate the vehicle strap sensor signal and the wheelchair strap sensor signal via radio frequency identification to a processing tag.

2. The wheelchair restraint of claim 1, wherein the vehicle strap further comprises an anchorage connector, that connects with the wheelchair anchor when in a lowered position, and a plunger, wherein when the anchorage connector is in the lowered position the plunger is pushed into the vehicle strap sensor such that the vehicle strap sensor indicates the vehicle strap is securely affixed.

3. The wheelchair restraint of claim 2 further comprising a vehicle engaged line that is level when the anchorage connector is in the lowered position and not level when the anchorage connector is not in the lowered position.

4. The wheelchair restraint of claim 2 wherein the tag is configured to receive the vehicle strap sensor signal via one or more inductive rings disposed on either side of one or more gaps between the tag and the vehicle strap sensor.

5. The wheelchair restraint of claim 3 wherein the wheelchair strap sensor further comprises a first magnet disposed with the central housing proximate to where the wheelchair strap connects to the central housing, and a second magnet disposed on the wheelchair strap and remote from the central housing when the wheelchair strap is in a fully extended position.

6. The wheelchair restraint of claim 1 further comprising a mobile data terminal, located on the demand response vehicle and comprising the processing tag, wherein the mobile data terminal is further configured to:
   instruct a driver of the demand response vehicle to perform a pickup of a client;
   determine if the client has the wheelchair; and
   allow the driver to indicate the driver has performed the pickup, wherein, if the client has the wheelchair the allowing further comprises looking for the wheelchair strap sensor signal to indicate the wheelchair strap is securely connected to the wheelchair via the wheelchair strap and the vehicle strap sensor electrical signal to indicate the vehicle strap is securely affixed to the wheelchair anchor of the demand response vehicle.

7. A system for secure use of a wheelchair in demand response transportation systems comprising:
   a wheelchair restraint comprising a central housing disposed between a vehicle strap and a wheelchair strap, the vehicle strap to secure the wheelchair restraint to a demand response vehicle, further comprising a vehicle strap sensor configured to provide a vehicle strap sensor electrical signal indicating whether the vehicle strap is securely affixed to a wheelchair anchor of the demand response vehicle;
   the wheelchair strap to secure the wheelchair restraint to the wheelchair, further comprising a wheelchair strap sensor configured to provide a wheelchair strap sensor signal indicating whether the wheelchair strap is securely connected to the wheelchair via the wheelchair strap and a tag configured to:
   receive the vehicle strap sensor signal and the wheelchair strap sensor signal; and
   communicate the vehicle strap sensor signal and the wheelchair strap sensor signal via radio frequency identification to a processing tag; and
   a mobile data terminal further comprising the processing tag and a status indicator, the mobile data terminal configured to:
   receive the vehicle strap sensor signal and the wheelchair strap sensor signal from the tag; and
   determine whether the wheelchair is in a secure state; and
   indicate whether the wheelchair is in the secure state.

8. The system of claim 7 wherein the mobile data terminal is further configured to prevent operation of the demand response vehicle if the indication is the wheelchair is not in the secure state.

9. The system of claim 7 wherein the indicating is further to a central management system that confirms the wheelchair is properly loaded.

\* \* \* \* \*